United States Patent [19]

Green et al.

[11] Patent Number: 4,738,870

[45] Date of Patent: * Apr. 19, 1988

[54] ADHERENT PHOTOPOLYMERIZABLE COMPOSITIONS

[75] Inventors: John G. Green, Baton Rouge, La.; Gerald K. McEwen, Midland, Mich.; David G. Hunt, Baton Rouge, La.

[73] Assignee: The Dow Chemical Company, Midland, Mich.

[*] Notice: The portion of the term of this patent subsequent to Apr. 14, 2004 has been disclaimed.

[21] Appl. No.: 845,292

[22] Filed: Mar. 27, 1986

[51] Int. Cl.$^4$ .......................... C08F 2/50; C08F 30/02
[52] U.S. Cl. ...................... 427/54.1; 522/44; 522/96; 522/103; 522/167; 522/171; 522/181; 526/278
[58] Field of Search ............ 522/171, 44, 96, 103, 522/167, 181; 525/287; 560/222; 526/278; 427/54.1

[56] References Cited

U.S. PATENT DOCUMENTS

| | | | |
|---|---|---|---|
| 2,439,214 | 4/1948 | Lindsey, Jr. | 526/278 |
| 2,586,885 | 2/1952 | Fon Toy | 526/156 |
| 2,818,362 | 12/1957 | Drechsel | 524/34 |
| 2,919,279 | 12/1959 | Walles et al. | 526/260 |
| 3,417,054 | 12/1968 | Merijian et al. | 526/260 |
| 3,437,514 | 4/1969 | Burlant | 522/99 |
| 3,468,982 | 9/1969 | Klein et al. | 526/278 |
| 3,684,779 | 8/1972 | Rapko | 526/271 |
| 3,855,364 | 12/1974 | Steckler | 526/277 |
| 3,867,351 | 2/1975 | Juna et al. | 522/171 |
| 3,874,906 | 4/1975 | Prucnal et al. | 525/38 |
| 3,879,498 | 4/1975 | Illiopulos | 526/278 |
| 3,957,918 | 5/1976 | Dickie et al. | 522/115 |
| 3,987,127 | 10/1976 | Dickie et al. | 522/115 |
| 4,052,279 | 10/1977 | Lyons | 522/76 |
| 4,059,721 | 11/1977 | Rosenkranz | 560/205 |
| 4,129,710 | 12/1978 | Jin | 521/137 |
| 4,195,103 | 3/1980 | Chang | 522/96 |
| 4,252,888 | 2/1981 | Rohloff | 522/181 |
| 4,348,427 | 9/1982 | Priola et al. | 522/107 |
| 4,438,190 | 3/1984 | Ishimaru et al. | 522/115 |
| 4,446,028 | 5/1984 | Becker | 252/181 |
| 4,446,046 | 5/1984 | Becker | 252/82 |
| 4,506,057 | 3/1985 | Greene et al. | 524/461 |
| 4,511,732 | 4/1985 | Hicks | 522/100 |

FOREIGN PATENT DOCUMENTS

| | | |
|---|---|---|
| 2411738 | 9/1975 | Fed. Rep. of Germany . |
| 2535640 | 2/1977 | Fed. Rep. of Germany . |
| 2614874 | 10/1977 | Fed. Rep. of Germany . |
| 2918161 | 11/1980 | Fed. Rep. of Germany . |
| 3001894 | 7/1981 | Fed. Rep. of Germany . |
| 2449446 | 7/1982 | Fed. Rep. of Germany . |
| 59-15468 | 1/1984 | Japan . |
| 1499783 | 2/1978 | United Kingdom . |
| 2089807 | 6/1982 | United Kingdom . |

Primary Examiner—John C. Bleutge
Assistant Examiner—David W. Woodward

[57] ABSTRACT

A highly adherent photopolymerizable composition comprises a (hydroxy)phosphinylalkyl monomer of the formula

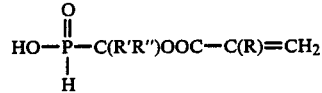

wherein R is hydrogen, methyl or ethyl and R' and R" are selected independently from hydrogen and alkyl of 1-10 carbon atoms; at least one copolymerizable ethylenically unsaturated monomer and a photoinitiator.

34 Claims, No Drawings

ADHERENT PHOTOPOLYMERIZABLE COMPOSITIONS

DESCRIPTION

1. Technical Field

This invention relates to a photopolymerizable composition which is highly adherent to metal substrates.

2. Background Art

The prior art has proposed a variety of photocurable compositions, intended for application to metallic substrates. These compositions usually contain a material known as an oligomer, which is generally a diethylenically unsaturated prepolymer, in which the terminal functional groups of a difunctional compound are reacted or "capped" with a polymerizable function. Oligomers can also be trifunctional and have three reactive end groups. The photopolymerizable compositions of the prior art normally also contain a diluent, which may copolymerize with the oligomer. In addition, the prior art photocurable compositions contain one or more photoinitiators, which catalyze the desired photopolymerization upon exposure to actinic radiation.

Steckler, in U.S. Pat. No. 3,855,364, has disclosed that phosphate compounds of the formula

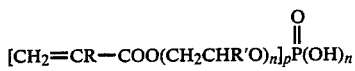

are polymerizable monomers. Inclusion of this type of monomer in radiation-polymerizable coatings is recited by Dickie et al., U.S. Pat. Nos. 3,957,918 and 3,987,127.

In U.S. Pat. No. 4,438,190, Ishimaru et al. have proposed photosensitive resin compositions, containing unsaturated phosphate monomers, for example, bis(acrylethyloxy)phosphate.

Juna et al., in U.S. Pat. No. 3,867,351, have disclosed compositions, curable by ultraviolet or other high energy radiation. The compositions contain alkylene phosphoric esters or alkylene phosphate esters of acrylic or methacrylic acids.

Yamanouchi et al., Japan Kokai No. 59-15468, have recited the use of acrylate or methacrylate esters of hydroxyalkylphosphorus-containing acids as monomers in adhesive compositions.

Typical prior art oligomers are those terminated or capped with acrylate or methacrylate groups and which have polyester, urethane, epoxy, polyether or acrylic backbones. Prucnal et al. (U.S. Pat. No. 3,874,906) recite oligomers prepared by reaction between epoxy condensates or polyesters and an alpha,beta-unsaturated carboxylic acid. Priola et al., U.S. Pat. No. 4,348,427, have disclosed using epoxy-acrylic resins, polyester-alpha,omega-acrylate resins, unsaturated polyester resins and urethane acrylate resins or oligomers in ultraviolet-curable coating compositions. However, a recurring problem in the art is that photopolymerizable compositions based on urethane and polyether oligomers do not adhere to various substrates as well as similar compositions containing epoxy oligomers. It is therefore desirable to provide a photopolymerizable composition, which cures rapidly and adheres well to various surfaces, regardless of the chemical nature of the oligomer used.

SUMMARY OF THE INVENTION

In one aspect, this invention relates to a photopolymerizable composition comprising a (hydroxy)phosphinylalkyl compound of the formula

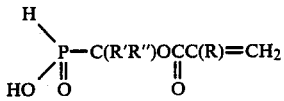

wherein R is hydrogen, methyl or ethyl and R' and R" are selected independently from hydrogen and alkyl of 1-10 carbon atoms in an amount sufficient to promote adhesion of the composition to a substrate; at least one copolymerizable ethylenically unsaturated monomer in an amount sufficient to provide the resulting photopolymerized composition with desired physical properties and a photoinitiator in an amount sufficient to initiate polymerization upon exposing the composition to light.

In another aspect, this invention relates to a process for adhering the foregoing composition to a substrate by coating the composition on a substrate and irradiating the thus-coated substrate with actinic radiation in an amount sufficient to cure the coating.

In a further aspect, this invention relates to a process for preparing a (hydroxy)phosphinylalkyl compound of the formula

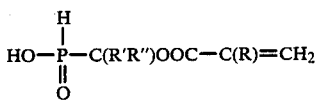

wherein R is hydrogen, methyl or ethyl and R' and R" are selected independently from hydrogen and alkyl or 1-10 carbon atoms, comprising the steps of:

(a) condensing hypophosphorous acid with an aldehyde or ketone of 1-10 carbon atoms to produce an intermediate 1-hydroxyalkylphosphorous acid compound and (b) esterifying the thus-produced intermediate 1-hydroxyalkylphosphorous acid compound with acrylic, methacrylic or ethacrylic acid.

DETAILED DESCRIPTION OF THE ILLUSTRATIVE EMBODIMENTS

The adhesion-promoting monomer used in the photocurable compositions of this invention is a (hydroxy)phosphinylalkyl acrylate, methacrylate or ethacrylate, compound or monomer represented by the formula

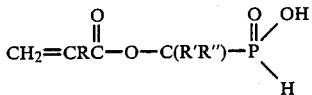

wherein R is hydrogen, methyl or ethyl and R' and R" are selected independently from hydrogen and alkyl of 1-10 carbon atoms.

In the specification and claims, (hydroxy)phosphinylalkyl compound and (hydroxy)phosphinylalkyl monomer are synonymous. Preferred (hydroxy)phosphinylalkyl monomers used in the compositions of this invention, are acrylates and methacrylates (R is hydrogen or methyl), in which R' is hydrogen or alkyl of 1-3 carbon atoms, most preferably hydrogen. Most preferably, R"

is also hydrogen. In the adherent coatings of this invention, it preferred to use the compounds in the form of the phosphorus acid, rather than in the form of a corresponding ammonium, alkali metal or alkaline earth metal salt.

The (hydroxy)phosphinylalkyl compounds are usually clear, viscous liquids, which are soluble in water and polar organic solvents, particularly methanol and dimethyl sulfoxide.

The (hydroxy)phosphinylalkyl monomers are used in an amount sufficient to promote adhesion of the resulting photopolymerized compositions to a substrate, i.e., provide increased adhesion as compared to compositions containing none of such monomer. Preferably, the composition contains from about 0.5% to about 20%, most preferably from about 1% to about 10% by weight of the (hydroxy)phosphinylalkyl monomer.

The (hydroxy)phosphinylalkyl monomers can be prepared by reaction between hypophosphorous acid and an aldehyde or ketone to produce an intermediate 1-hydroxyalkylphosphorous acid, which is converted to a corresponding alpha,beta-unsaturated ester by reaction with acrylic, methacrylic or ethacrylic acid. The preparation of these monomers can be represented by the equations:

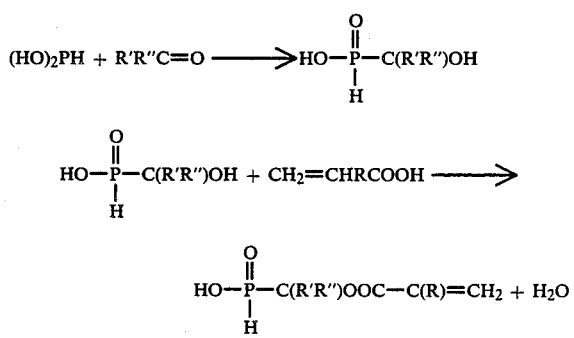

wherein R, R' and R" are as above.

In the first step of the process, hypophosphorous acid is condensed with an aldehyde or ketone in about 3:1 to about 1:1 molar ratios of the acid to the aldehyde or the ketone. The aldehyde or ketone should not be present in an amount in excess of the hypophosphorous acid so as to avoid multiple additions of aldehyde or ketone to the hypophosphorous acid. The condensation is carried out in an aqueous solution. It is preferred to add the aldehyde or ketone to an aqueous solution of hypophosphorous acid because the reaction is exothermic and slow addition results in better control of the reaction temperature than otherwise.

The condensation can be carried out at any temperature at which the reaction occurs. Preferred temperatures are from about 20° C. to about 100° C. Most preferred temperatures are between about 70° C. and 90° C.

The condensation can be carried out at any pressure, at which the reaction occurs. However, it is preferred to run the reaction at ambient or atmospheric pressure so as to avoid the use of pressure or vacuum apparatus. Although it is not necessary to run the condensation under an inert atmosphere, it is preferred to do so. Exemplary inert atmospheres include nitrogen, argon and the like.

The reaction time is selected to give the desired degree of conversion. Generally, reaction times of three to ten hours will be preferred. At the end of the reaction, water solvent is removed under reduced pressure and the residual 1-hydroxyalkylphosphorous acid product converted to an acrylate or methacrylate.

The esterification of 1-hydroxyalkylphosphorous acid with the desired alpha,beta-unsaturated acid is done at ratios of about 3:1 to about 1:3 moles of reactants. It is preferred to use about 2:1 to about 1:2 moles of reactants, although a 1:1 ratio is most preferred. When either reagent is used in excess, it is preferred to use an excess of the alpha,beta-unsaturated acid reactant.

The esterification with the alpha,beta-unsaturated acid is normally carried out in an inert organic solvent. Exemplary of preferred solvents are aromatic hydrocarbons and chlorinated solvents, such as benzene, toluene, xylene, cumene, cymene, ethylene dichloride, trichloroethane, and perchloroethylene. It is most preferred to use solvents having a boiling point about 100° C., most preferably over 120° C. The use of xylene or perchloroethylene is most preferred.

The esterification is done in the presence of an esterification catalyst, preferably a strong acid. Examples of preferred catalysts include sulfonic acids, sulfuric acid and phosphoric acids. p-Toluenesulfonic acid is a most preferred catalyst.

The esterification reaction can be carried out at any temperature, but it is preferred to carry out the reaction under reflux. Accordingly, preferred temperatures are above 100° C., most preferably above 120° C.

Water produced as a by-product of the esterification is preferably removed as it is formed so as to drive the reaction to completion.

The esterification can be done at atmospheric or superatmospheric pressures. However, atmospheric pressure is preferred. The use of an inert atmosphere is optional. Reaction times are selected to give the desired conversion and are preferably between four and ten hours.

The adhesion-promoting (hydroxy)phosphinylalkyl compounds can be copolymerized with a variety of unsaturated monomers. Usually the photopolymerizable composition will contain a diethylenically or triethylenically unsaturated oligomer. Typical these oligomers are polyesters, polyethers, urethanes, epoxy or acrylic prepolymers which have two or three reactive terminal groups. The terminal groups are reacted or "capped" with an ethylenically unsaturated function, such as acrylate, methacrylate, ethacrylate, vinyl ether, allyl ether or the like. Typical oligomers are disclosed by Priola et al., U.S. Pat. No. 4,348,427; Dickie et al., U.S. Pat. Nos. 3,957,918 and 3,987,127; Prucnal et al, U.S. Pat. No. 3,874,906; Rohloff, U.S. Pat. No. 4,252,888; and Ishimaru et al., U.S. Pat. No. 4,438,190, all herein incorporated by reference.

Preferred oligomers for use in the photopolymerizable or photocurable compositions of this invention are di- or tri-esters of acrylic, methacrylic or ethacrylic acid. These compounds can be represented by the formulas

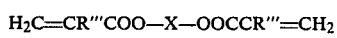

or

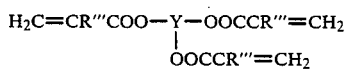

wherein X is the residue of a difunctional polyester, urethane, epoxy, polyether or acrylic prepolymer; Y is the residue of a trifunctional polyester, urethane, epoxy, polyether or acrylic prepolymer and R''' is hydrogen, methyl or ethyl. It will be understood that mixtures of acrylates, methacrylates and ethacrylates can also be used.

More preferably, the photopolymerizable compositions of this invention will contain an acrylic oligomer represented by the formula $$CH_2=CR'''COO-X-OOCCR'''=CH_2$$

wherein X represents the backbone of the oligomer and is a polyether in which X is a low molecular weight ethylene oxide or propylene oxide polymer or corresponding block copolymer. Therefore X can be represented by the formulas $$-CH_2CH_2O(CH_2CH_2O)_nCH_2CH_2-,$$

$$-CH_2CH(CH_3)O[CH_2CH(CH_3)O]_nCH_2CH(CH_3)-,$$

$$-CH_2CH(CH_3)O[CH_2CH(CH_3)O]_q(CH_2CH_2O)_pCH_2CH_2-$$

$$-CH_2CH_2O(CH_2CH_2O)_p[CH_2CH(CH_3)O]_qCH_2CH(CH_3)-,$$

wherein n is 5-50 and the sum of p=q is n.

A further preferred oligomer for use in the photocurable compositions of this invention is a diacrylate, dimethacrylate or diethacrylate in which X is a urethanated polyether. Most preferably, the polyether is polypropylene oxide containing 12-22 propylene oxide units. In this case, X can be represented by the formula $$-R''''OOC-NH-Z-NHCOO-CH_2CH(CH_3)O[CH_2CH(CH_3)O]_n-CH_2CH(CH_3)OOCNH-Z-NHCOOR''''-$$

wherein Z is the residue of a diisocyanate, R'''' is alkylene or oxaalkylene of 2-12 carbon atoms and n is 10-20.

It will be understood that Z can be derived from any readily available diisocyanate. Representative of these materials are toluene diisocyanate, methylenebis(phenyl isocyanate) and polymers therof (often called polymeric MDI), isophorone diisocyanate, hexamethylene diisocyanate and the like. The alkylene or oxaalkylene function is derived from a monoacrylate of a glycol, such as ethylene glcyol monoacrylate, butylene glycol monomethacrylate, hydroxyethoxyethyl ethacrylate, propylene glycol monomethacrylate and similar compounds.

The preferred oligomers are made by the following series of reactions:

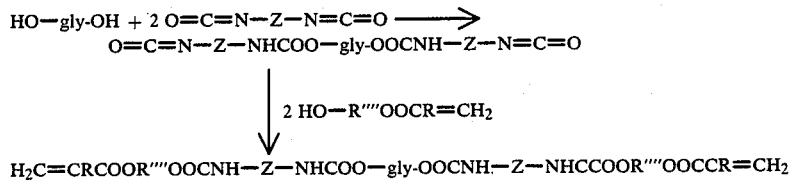

wherein HO-gly-OH represents a polyether glycol. Oligomers can also be prepared in the same fashion from polyester glycols, obtained by reaction between diacids and an excess of a simple glycol. Polyester glycols can also be obtained from a simple glycol and a lactone, for example, caprolactone. Acrylated urethanated glycols are disclosed by Ishimaru et al., supra.

An acrylated urethanated polyol suitable for use in the practice of this invention can be purchased under the name of Celrad 6700 (Celanese Chemical Corp.).

Acrylated epoxy oligomers, useful in the practice of this invention, have been disclosed by Rohloff and Prucnal et al., supra, and Hicks (U.S. Pat. No. 4,511,732). Photo-curable compositions made from acrylated epoxy precursors have shown particularly good adhesion to metals. A composition containing an N-vinyloxazolidinone comonomer is particularly preferred.

An acrylated epoxy composition suitable for use in the practice of this invention can be purchased under the name of Celrad 3700 (Celanese Chemical Corp.).

The photopolymerizable compositions can also contain ethylenically unsaturated monomers which polymerize with the oligomer or which can constitute the entire monomer charge. These monomers can be selected from well known ethylenically unsaturated monomers, including but not limited to N-vinyl-2-pyrrolidinone, an N-vinyl-2-oxazolidinone; a vinyl ether of an alkanol of 1-20 carbon atoms or vinyl ester of a carboxylic acid of 1-20 carbon atoms; alkyl or alkoxyalkyleneoxyalkyl esters of acrylic, methacrylic or ethacrylic acids; or a diacrylate, dimethacrylate or diethacrylate of a glycol of 2-20 carbon atoms.

One preferred composition of this invention contains N-vinyl-2-pyrrolidinone in addition to an acrylated urethanated polyether polyol. Contemplated equivalents of N-vinyl-2-pyrrolidinone include, but are not limited, to N-vinyl-3-butyl-2-pyrrolidinone, N-vinyl-3,3,5-trimethyl-2-pyrrolidinone, N-vinyl-6-butylpiperidone, N-vinyl-7-ethylcaprolactam, N-vinyl-3,5,7-caprolactam, etc. It is preferred that the composition contain more than 50% by weight of the acrylated urethanated oligomer, most preferably 60-80% by weight. These compounds are disclosed by Merijan et al., U.S. Pat. No. 3,417,054.

N-Vinyl-2-oxazolidinones which can be used in the compositions of this invention, include, for example, N-vinyl-2-oxazolidinone, N-vinyl-5-methyl-2-oxazolidinone, N-vinyl-5-ethyl-2-oxazolidinone, N-vinyl-5-ethyl-4-methyl-2-oxazolidinone, etc. These compounds are known and disclosed in U.S. Pat. Nos. 2,818,362 by Drechsel et al. and 2,919,279 by Walles et al., incorporated herein by reference.

Representative of the vinyl ethers which can be used in the compositions of this invention are methyl vinyl ether, ethyl vinyl ether, propyl vinyl ether, hexyl vinyl ether, decyl vinyl ether and the like. Vinyl esters which can be used in the compositions include, for example, vinyl formate, vinyl acetate, vinyl propionate, vinyl butyrate, vinyl dodecanoate, vinyl hexadecanoate, and vinyl octadecanoate.

A preferred additional monomer in the compositions of this invention is an alkyl or alkyloxyalkylenealkyl ester of acrylic, methacrylic or ethacrylic acid. Typical alkyl esters include lauryl methacrylate, stearyl acrylate, palmityl methacrylate, octyl acrylate and the like.

The ether esters are preferred, particularly those obtained by reaction of a lower alkanol with an alkylene oxide to produce an alkoxyalkylenealkanol, which is esterified with the selected alpha,beta-unsaturated acid. The ether esters can be represented by the formula, in the case of an acrylate:

wherein alk is an alkylene of 2–10 carbon atoms, y is 0–10 and T is alkyl of 1–6 carbon atoms. Accordingly, a representative additive, also known as butoxy di/triethoxyethyl acrylate, is of the formula:

A preferred photopolymerizable composition containing an alkoxyalkyleneoxyalkyl acrylic ester contains at least 50% by weight of acrylated urethanated polyether oligomer, most preferably 60–80% by weight of the oligomer.

The compositions can also contain a diacrylate, dimethacrylate or diethacrylate of a glycol of 2–20 carbon atoms, including polyoxyalkylene glycols based on lower alkylene oxides. Accordingly, this type of monomer includes diacrylates, dimethacrylates and diethacrylates of ethylene glycol, propylene glycol, butylene glycol, hexylene glycol and polyethylene and polypropylene glycols of the appropriate molecular weight. Preferred compositions are those made with an acrylated, urethanated polyether glycol, in proportions as above.

A further copolymerizable monomer comprises a triacrylate, trimethacylate or triethacrylate of a triol, particularly of trimethylolpropane, triethylolpropane and glycerol. Mixed esters of the various alpha,beta-unsaturated acids can also be used. A preferred composition containing these triethylenically unsaturated monomers is an acrylated urethanated polyether, as above.

Representative di- and triacrylic esters are disclosed by Rosenkranz et al. (U.S. Pat. No. 4,059,721) and Hicks, supra.

The compositions of the invention also contain a photoinitator, alone or in combination with a photosensitizer. Photoinitiators and photosensitizers are used to control the photopolymerization reaction and to make the curing process more efficient than a corresponding uninitiated reaction.

Photoinitiators are compounds which absorb photons and thus obtain energy to form radical pairs, at least one of which can initiate addition polymerization. Photosensitizers are materials which absorb photons readily but which are poor photoinitiators. Photosensitizers absorb photons to produce molecules in an excited state, which can interact with a second compound to produce free radical initiators for addition polymerization. The compound with which a photosensitizer interacts can be a monomer, a polymer or a conventional initiator. The photoinitiator can also be admixed with a synergistic agent, for example, a tertiary amine, which functions to enhance the conversion of energy absorbed from photons to free radical polymerization initiators.

Any of the well-known and commonly-used photoinitiators can be used in the compositions of this invention. These include vicinal ketoaldehydes or diketones, for example, diacetyl, 2,3-pentanedione, 2,3-octanedione, 1-phenyl-1,2-butanedione, 2,2-dimethyl-4-phenyl-3,4-butanedione, phenylglyoxal or diphenyltriketone; aromatic diketones, for example, ortho- and para-anthraquinones or ortho- or para-benzoquinones; acyloin ethers, for example, benzoin methyl ether, pivaloin methyl ether, benzoin ethyl ether, benzoin propyl ether or benzoin phenyl ether; and alpha-hydrocarbyl-substituted acyloins, for example, alpha-methylbenzoin or phenylbenzoin.

Other representative photoinitiators include diaryl ketones, such as benzophenone, phenyl naphthyl ketone, dinaphthyl ketone and the like; organic disulfides, such as diphenyl disulfide; and ketophenone diketals, for example, alpha,alpha-dimethoxyacetophenone, alpha,alpha-diethoxyacetophenone or alpha,alpha-dimethoxy-2-phenylacetophenone.

Preferred photoinitiators include diketals of acetophenones, particularly of alpha,alpha-dimethoxy or diethoxyacetophenone or alpha,alpha-dimethoxy-2-phenylacetophenone. The latter compound is available from Ciba-Geigy Corp. as Irgacure 651. Another preferred photoinitiator is a benzoin ether known as Vicure 10 (Stauffer Chemical Co.). A further preferred photoinitiator is 1-hydroxycyclohexyl phenyl ketone (Irgacure 184).

The amount of photoinitiator in the photocurable composition is adjusted to initiate the polymerization following application of the selected amount of actinic radiation. If the photoinitiator concentration is too high, curing or polymerization may occur only at the surface of the composition applied. If the amount of photoinitiator is too low, undesirably lengthy exposure to the actinic radiation may be required to cure the composition and adhere it to the substrate being coated. Generally, the photocurable coating compositions will contain 0.01–10% by weight of photoinitiator, including any photosensitizer or synergistic additives.

Representative examples of photosensitizers include benzophenone, 4,4-bis-(N,N-dimethylamino)benzophenone, 2-chlorothiaxanthone, benzil and 9,10-anthraquinone. As noted above, the photosensitizer in some cases functions also as photoinitiator. The amount of photosensitizer used in the compositions is most conveniently determined empirically. Factors influencing the amount, if any, of photosensitizer include the amount of actinic light being applied, the desired curing time and the monomeric constituents of the compositions.

It will be appreciated that, if appropriate, the compositions of this invention can also contain additives such as polymerization inhibitors, surfactants, levelling agents, flow control agents, dyestuffs or pigments, fillers, plasticizers or reinforcing agents.

In most cases, the compositions of this invention are made by adding a simple mono-, di- or triethylenically unsaturated monomer to a copolymerizable ethylenically unsaturated oligomer. The mixture is stirred or blended to assure homogeneity. The photoinitiator and other additives can be added during the mixing process.

The photocurable coating compositions of this invention are applied to a substrate to provide a film of the desired thickness. This normally ranges from about 0.1 to about 20 mils, but thicker coatings are to be considered within the scope of this invention. The coatings can be applied by any number of conventional techniques, such as spraying, printing, dipping, brushing or roll coating.

The substrates to be coated by the highly-adherent compositions of this invention include metals, polymers and substrates derived from natural products, particularly cellulose-derived products. Metallic substrates which can be coated in accordance with this invention include iron, steel, stainless steel, copper, bronze, brass, aluminum, magnesium, nickel, titanium, zinc, chromium and alloys thereof. Polymeric substrates include polyesters, polyamides, cured aminoplasts, acrylic resins, polyurethanes, rubber, cured aminoplasts and cured phenolics. Substrates derived from natural products include wood, fiber board, composition board, cardboard, paper and particle board. Inorganic substrates which can be coated with the compositions of this invention include glass, ceramic materials and quartz.

The compositions of this invention can be cured by actinic radiation or by high energy radiation. These kinds of radiation include ultraviolet light and electron beam irradiation, but refer to any kind of radiation which can produce free radicals and bring about polymerization of ethylenically unsaturated compounds. The use of a photoinitiator is not required when electron beam irradiation is used. However, it is preferred to use ultraviolet light to initiate polymerization and the inclusion of a photoinitiator in the compositions is preferred.

Sources of ultraviolet light include mercury arcs; carbon arcs; low, medium and high pressure mercury lamps; swirl-flow plasma arcs; and ultraviolet-emitting diodes and lasers. Preferred sources of ultraviolet light are medium and high pressure mercury vapor lamps.

The compositions of the invention are particularly useful for protective coatings for various substrates, particularly for metals.

BEST MODE FOR CARRYING OUT THE INVENTION

In a most preferred aspect the compositions of this invention will comprise an acrylated urethanated polyether oligomer, diluted with N-vinyl-2-pyrrolidinone, or an alpha,beta-unsaturated ester of an alkoxyalkyleneoxyalkanol, a glycol or a triol.

In another most preferred embodiment, the compositions of this invention will comprise an acrylated epoxy oligomer, diluted with an N-vinyloxazolidinone and an alpha,beta-unsaturated ester of an alkoxyalkyleneoxyalkanol, a glycol or a triol.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following examples, temperatures are set forth uncorrected in degrees Celsius. Unless otherwise indicated, all parts and percentages are by weight.

EXAMPLE 1

(a) Preparation of Hydroxymethylphosphorous Acid

Into a 500-ml, three-necked flask, fitted with a magnetic stirrer, thermometer, nitrogen inlet and condenser, is charged 264 g of 50% hypophosphorous acid. The acid is stirred and heated at 80° C. during the addition of paraformaldehyde (66 g) in about 2.5 g portions over about 30 min. The resulting solution is maintained at 80° C. for 3 h after all the paraformaldehyde is added. After addition of 4 more g of paraformaldehyde, heating at 80° C. is continued for 3 hr more. Water is removed from the resulting clear solution on a rotating evaporator. After addition of 100 ml of ethanol, the solution is again concentrated using a rotary evaporator. The resulting clear liquid is characterized by $^{13}$C and $^{31}$P nuclear magnetic resonance.

[$\delta^{31}P = 30.0$ ppm; $J_{PH} = 549$ Hz]

(b) Preparation of (Hydroxy)phosphinylmethyl Methacrylate

To a two-liter, three-necked flask, equipped with a mechanical stirrer, nitrogen sparge and a modified Dean-Stark trap and condenser is charged the following mixture:

| | |
|---|---|
| 96 g (1 mole) | hydroxymethylphosphorous acid |
| 258 g (3 mole) | methacrylic acid |
| 0.4 g | phenothiazine |
| 0.8 g | benzyltrimethylammonium chloride |
| 0.4 g | p-toluenesulfonic acid |
| 1 liter | perchloroethylene |

The mixture is stirred and heated under reflux, under an atmosphere of nitrogen for 7 h. At the end of this time 17.8 ml of water has been collected in the trap.

The resulting two-phase mixture is cooled and extracted with three 600-ml portions of water. The combined water extracts are concentrated on a rotary evaporator. Residual water and excess methacrylic acid are removed by distillation under vaccum.

The clear, viscous liquid product is characterized by $^{13}$C and $^{31}$P nuclear magnetic resonance.

[$\delta^{31}P = 21.8$ ppm; $J_{PH} = 565$ Hz]

EXAMPLE 2

Ultraviolet-curable Compositions Containing (Hydroxy)phosphinylmethyl Methacrylate (a) A masterbatch composition consisting of 213.3 g of acrylated urethane diol (about 14 propylene oxide units in diol), 90.9 g of N-vinylpyrrolidinone and 9.12 g of 2,2-dimethoxy-2-phenylacetophenone (Irgacure 651, Ciba-Geigy Corp.) in 8.73 g of N-vinylpyrrolidinone is made.

The formulation is applied (2 mil wet coating) to Bonderite 37-treated steel plates (Parker Chemical Co., Morenci, Mich.) and cured in an Ashdee UV oven (Ashdee Division of George Koch & Sons, Inc., Evansville, Ind.) under 200 watt/inch (78.7 watt/cm) mercury vapor ultraviolet lamps and an air flow of 40–45 ft/min (12.2–13.7 m/min). The oven permits curing on a variable-speed conveyor, on which the panels are placed and carried under the UV lamps. The adhesion is evaluated by the cross-hatch adhesion test (ASTM D3359-79), in which less than 65% adhesion at a selected time is rated 0 and 100% adhesion is rated 5. The masterbatch rates 0 (no adhesion) after 1 day and 0 (40% adhesion) after 7 days cure.

The masterbatch is formulated to include 5.1% by weight of (hydroxy)phosphinylmethyl methacrylate. Adhesion of this composition to steel panels is evaluated as above. Adhesion after 1 day is 6% (0 rating) and, after 7 days, 80% (2-3 rating). Therefore, inclusion of (hydroxy)phosphinylmethyl methacrylate improves adhesion of the UV-cured coating material to steel.

(b) A masterbatch is prepared from 221.6 g of acrylated urethanated diol (about 14 propylene oxide units), 80.1 g of butoxydi/triethoxyethyl (80:20) acrylate, $BuO(CH_2CH_2O)_{3-4}OCCH_2=CH_2$, and 9.35 g of Irgacure 651. The composition is applied to steel plates to a thickness of 2 mil and cured as above. Adhesion, determined as above, is 65% (0 rating) after one day and 80% (2-3 rating) after 2-3 days.

The masterbatch of paragraph (b) is formulated to include 5.1% by weight of (hydroxy)phosphinylmethyl methacrylate. The formulation is applied to steel plates and cured as above. At the end of the first day's curing, the phosphorus-containing mixture shows 100% adhesion (5 rating).

(c) A masterbatch is prepared from 293.6 g of acrylated urethanated diol (about 14 propylene oxide units), 53.5 g of ethoxyethoxyethyl acrylate, 31.3 g of hexanediol diacrylate, 10.8 g of Irgacure 651, 20.2 g of N-vinylpyrrolidone and 20.5 g of trimethylolpropane triacrylate. The composition, applied to Bonderite-coated steel to a thickness of 2 mil, and cured as above exhibits no adhesion initially and 11% adhesion (0 rating after 12 days).

This formulation is modified to include 4.9% by weight of (hydroxy)phosphinylmethyl methacrylate. Adhesion is nil (0 rating) after 1 day and 69% (1 rating) after 12 days.

EXAMPLE 3

(a) Preparation of (Ethyl)(hydroxy)methylphosphorous acid; (Ethyl)(hydroxy)phosphinyl Methacrylate A reaction is run as in Example 1(a), using propionaldehyde instead of formaldehyde. The intermediate (ethyl)hydroxymethylphosphorous acid is esterified with methacrylic acid as in Example 1(b) to produce a product wherein R is methyl, R' is hydrogen and R" is ethyl.

EXAMPLE 4

Ultraviolet-curable Compositions Containing (Hydroxy)phosphinylmethyl Methacrylate (a) A masterbatch is prepared from 53% by weight acrylated epoxy oligomer (Celrad 3700, Celanese Chemical Corp.), 10.7% by weight of hexanediol diacrylate, 31% by weight of trimethylolpropane triacrylate and 5% by weight of N-vinyl-5-methyl-2-oxazolidinone. 1-Hydroxycyclohexyl phenyl ketone (0.21% by weight, Irgacure 184, Ciba Geigy Corp.) is used as initiator.

The masterbatch is applied to panels of no. 25 cold-rolled steel and evaluated as in Example 2. Adhesion after one pass through the oven is 0% (0 rating).

(b) To the masterbatch of part (a) is added 0.32% by weight of (hydroxy)phosphinylmethyl methacrylate. The resulting mixture is applied to no. 25 rolled-steel plates and evaluated as in part (a). Adhesion under the same conditions is 98% (5 rating). Therefore, a composition containing an adhesion-promoting (hydroxy)alkylphosphinyl compound, an acrylated epoxy oligomer and an N-vinyloxazolidinone compound is much more adherent than a composition containing no (hydroxy)phosphinylalkyl compound.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A photopolymerizable composition comprising a (hydroxy)phosphinylalkyl compound of the formula

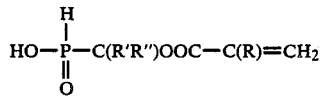

wherein R is hydrogen, methyl or ethyl and R' and R" are selected independently from hydrogen and alkyl of 1-10 carbon atoms, in an amount sufficient to promote adhesion of the resulting photopolymerizable composition to a substrate; at least one copolymerizable ethylenically unsaturated monomer in an amount sufficient to provide the resulting photopolymerized composition with desired physical properties and a photoinitiator in an amount sufficient to initiate polymerization upon exposing the composition to light.

2. The composition of claim 1, wherein R' is hydrogen or alkyl of 1-3 carbon atoms and R" is hydrogen.

3. The composition of claim 1, wherein R is hydrogen or methyl; R' is hydrogen or alkyl of 1-3 carbon atoms and R" is hydrogen.

4. The composition of claim 1, wherein a copolymerizable ethylenically unsaturated monomer is a diethylenically unsaturated or triethylenically unsaturated oligomer of the formula

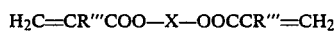

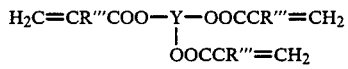

wherein X is the residue of a difunctional polyether, polyester, urethane, epoxy or acrylic prepolymer; Y is the residue of a trifunctional polyester, urethane, epoxy, polyether or acrylic prepolymer and R''' is hydrogen, methyl or ethyl.

5. The composition of claim 4, wherein X is polyether of the formula $-CH_2CH_2O(CH_2CH_2O)_nCH_2CH_2-$, $-CH_2CH(CH_3)O[CH_2CH(CH_3)O]_nCH_2CH(CH_3)-$, $-CH_2CH(CH_3)O[CH_2CH(CH_3)O]_q(CH_2CH_2O)_pCH_2CH_2-$ or $-CH_2CH_2O(CH_2CH_2O)_p[CH_2CH(CH_3)O]_qCH_2CH(CH_3)-$, wherein n is 5-50 and the sum of p+q is n.

6. The composition of claim 4, wherein X is an urethane of the formula

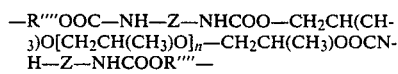

wherein Z is the residue of a diisocyanate, R'''' is alkylene or oxaalkylene of 2–12 carbon atoms and n is 10–20.

7. The composition of claim 4, wherein X is an epoxy oligomer.

8. The composition of claim 1, wherein an ethylenically unsaturated monomer is selected from N-vinyl-2-pyrrolidinone; an N-vinyl-2-oxazolidinone; an alkoxyalkyleneoxyalkyl acrylate, methacrylate or ethacrylate; or a diacrylate, dimethacrylate or diethacrylate of a glycol of 2–20 carbon atoms.

9. The composition of claim 1, wherein an ethylenically unsaturated monomer is a triethylenically unsaturated monomer selected from a triacrylate, trimethacrylate or triethacrylate of trimethylolpropane, triethylolpropane or glycerol.

10. The composition of claim 1, wherein the photoinitiator is a 2,2-dialkoxy-2-phenylacetophenone.

11. The composition of claim 4, wherein the (hydroxy)phosphinylalkyl compound is (hydroxy)phosphinylmethyl acrylate or methacrylate.

12. The composition of claim 5, wherein the (hydroxy)phosphinylalkyl compound is (hydroxy)phosphinylmethyl acrylate or methacrylate.

13. The composition of claim 6, wherein the (hydroxy)phosphinylalkyl compound is (hydroxy)phosphinylmethyl acrylate or methacrylate.

14. The composition of claim 7, wherein the (hydroxy)phosphinylalkyl compound is (hydroxy)phosphinylmethyl acrylate or methacrylate.

15. The composition of claim 5, wherein the (hydroxy)phosphinylalkyl compound is (hydroxy)phosphinylmethyl acrylate or methacrylate and the composition further contains N-vinyl-2-pyrrolidinone.

16. The composition of claim 5, wherein the (hydroxy)phosphinylalkyl compound is (hydroxy)phosphinylmethyl acrylate or methacrylate and the composition further contains a diacrylate or dimethacrylate of a glycol of 2–20 carbon atoms.

17. The composition of claim 5, wherein the (hydroxy)phosphinylalkyl compound is (hydroxy)phosphinylmethyl acrylate or methacrylate and the composition further contains a triacrylate, trimethacrylate or triethacrylate or trimethylolpropane, triethylolpropane or glycerol.

18. The composition of claim 5, wherein the (hydroxy)phosphinylalkyl compound is (hydroxy)phosphinylmethyl acrylate or methacrylate and the composition further contains an alkoxyalkyleneoxyalkyl acrylate, methacrylate or ethacrylate.

19. The composition of claim 6, wherein the (hydroxy)phosphinylalkyl compound is (hydroxy)phosphinylmethyl acrylate or methacrylate and the composition further contains N-vinyl-2-pyrrolidinone.

20. The composition of claim 6, wherein the (hydroxy)phosphinylalkyl compound is (hydroxy)phosphinylmethyl acrylate or methacrylate and the composition further contains a diacrylate or dimethacrylate of a glycol of 2–20 carbon atoms.

21. The composition of claim 6, wherein the (hydroxy)phosphinylalkyl compound is (hydroxy)phosphinylmethyl acrylate or methacrylate and the composition further contains a triacrylate, trimethacrylate or triethacrylate of trimethylolpropane, triethylolpropane or glycerol.

22. The composition of claim 6, wherein the (hydroxy)phosphinylalkyl compound is (hydroxy)phosphinylmethyl acrylate or methacrylate and the composition further contains an alkoxyalkyleneoxyalkyl acrylate, methacrylate or ethacrylate.

23. The composition of claim 7, wherein the (hydroxy)phosphinylalkyl compound is (hydroxy)phosphinylmethyl acrylate or methacrylate and the composition further contains a triacrylate, trimethyacrylate or triethacrylate of trimethylolpropane, triethylolpropane or glycerol.

24. The composition of claim 7, wherein the (hydroxy)phosphinylalkyl compound is (hydroxy)phosphinylmethyl acrylate or methacrylate and the composition further contains an N-vinyl-2-oxazolidinone.

25. The composition of claim 1, wherein the photoinitiator is 1-cyclohexyl phenyl ketone.

26. The composition of claim 1, wherein the (hydroxy)phosphinylalkyl compound comprises from about 0.5% by weight to about 20% by weight of the photopolymerizable composition.

27. The composition of claim 1, wherein the (hydroxy)phosphinylalkyl compound comprises from about 1% by weight to about 10% by weight of the resulting composition.

28. A process for coating a substrate comprising applying to the substrate a composition of claim 1 and exposing the thus-coated substrate to actinic radiation for a time sufficient to photopolymerize the composition.

29. A process for coating a substrate comprising applying to the substrate a composition of claim 5 and exposing the thus-coated substrate to actinic radiation for a time sufficient to photopolymerize the composition.

30. A process for coating a substrate comprising applying to the substrate a composition of claim 6 and exposing the thus-coated substrate to actinic radiation for a time sufficient to photopolymerize the composition.

31. The process of claim 28, wherein the substrate is a metal and the actinic radiation is in the ultraviolet range.

32. A process for coating a substrate comprising applying to the substrate a composition of claim 7 and exposing the thus-coated substrate to actinic radiation for a time sufficient to photpolymerize the composition.

33. A process for coating a substate comprising applying to the substrate a composition of claim 27 and exposing the thus-coated substrate to actinic radiation for a time sufficient to photopolymerize the composition.

34. The process of claim 33, wherein the substrate is a metal and the actinic radiation is in the ultraviolet range.

* * * * *